US009122493B2

(12) United States Patent
Wu

(10) Patent No.: US 9,122,493 B2
(45) Date of Patent: *Sep. 1, 2015

(54) RETRIEVING BOOT INSTRUCTIONS FROM NONVOLATILE MEMORY

(71) Applicant: Apple Inc., Cupertino, CA (US)

(72) Inventor: Stephen Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,365

(22) Filed: Aug. 1, 2014

(65) Prior Publication Data

US 2014/0344564 A1 Nov. 20, 2014

Related U.S. Application Data

(63) Continuation of application No. 14/022,576, filed on Sep. 10, 2013, now Pat. No. 8,832,423, which is a continuation of application No. 12/961,449, filed on Dec. 6, 2010, now Pat. No. 8,533,448, which is a continuation of application No. 11/400,854, filed on Apr. 10, 2006, now Pat. No. 7,849,302.

(51) Int. Cl.
*G06F 9/44* (2006.01)
*G06F 9/445* (2006.01)
(Continued)

(52) U.S. Cl.
CPC .............. *G06F 9/4406* (2013.01); *G06F 1/24* (2013.01); *G06F 9/4401* (2013.01); *G06F 9/4403* (2013.01); *G06F 9/44573* (2013.01); *G06F 12/0246* (2013.01); *G06F 2212/7201* (2013.01)

(58) Field of Classification Search
CPC ................... G06F 9/44; G06F 9/4401

USPC .......................................... 713/1, 2
See application file for complete search history.

(56) References Cited

U.S. PATENT DOCUMENTS

| 5,602,987 A | 2/1997 | Harari et al. |
| 5,671,229 A | 9/1997 | Harari et al. |
| 5,719,808 A | 2/1998 | Harari et al. |

(Continued)

FOREIGN PATENT DOCUMENTS

| JP | H05282882 | 10/1993 |
| JP | 2002328836 | 11/2002 |

(Continued)

OTHER PUBLICATIONS

Office Action from European Application No. 07760402.3, issued Dec. 16, 2014, Apple Inc., pp. 1-5.

*Primary Examiner* — Chun Cao
(74) *Attorney, Agent, or Firm* — Meyertons, Hood, Kivlin, Kowert & Goetzel, P.C.

(57) ABSTRACT

Systems and processes for booting a device can be implemented by detecting a reset signal associated with the device and retrieving a predetermined page of data from a nonvolatile memory location into a register associated with the nonvolatile memory. The nonvolatile memory may be designed and implemented such that each page of data is retrieved from the nonvolatile memory as a unit, and the page of data includes instructions for use in booting the device. A command to read data stored in the register is received, and the command can include an address identifying a location of one or more instructions within the register. In response, the one or more instructions are retrieved from the register for execution by a processor.

20 Claims, 4 Drawing Sheets

(51) Int. Cl.
*G06F 1/24* (2006.01)
*G06F 12/02* (2006.01)

(56) References Cited

U.S. PATENT DOCUMENTS

| | | | |
|---|---|---|---|
| 5,892,777 | A | 4/1999 | Nesheiwat et al. |
| 5,903,509 | A | 5/1999 | Ryan et al. |
| 6,026,465 | A | 2/2000 | Mills et al. |
| 6,149,316 | A | 11/2000 | Harari et al. |
| 6,314,049 | B1 | 11/2001 | Roohparvar |
| 6,426,893 | B1 | 7/2002 | Conley et al. |
| 6,721,820 | B2 | 4/2004 | Zilberman et al. |
| 6,757,842 | B2 | 6/2004 | Harari et al. |
| 6,763,424 | B2 | 7/2004 | Conley |
| 6,914,846 | B2 | 7/2005 | Harari et al. |
| 6,947,332 | B2 | 9/2005 | Wallace et al. |
| 7,137,011 | B1 | 11/2006 | Harari et al. |
| 7,162,569 | B2 | 1/2007 | Conley et al. |
| 7,234,049 | B2 | 6/2007 | Choi et al. |
| 7,237,046 | B2 | 6/2007 | Paley et al. |
| 7,237,074 | B2 | 6/2007 | Guterman et al. |
| 7,240,219 | B2 | 7/2007 | Teicher et al. |
| 7,475,184 | B2 | 1/2009 | Lee |
| 7,849,302 | B2 | 12/2010 | Wu |
| 8,533,448 | B2 | 9/2013 | Wu |
| 8,832,423 | B2 * | 9/2014 | Wu ................................. 713/2 |
| 2003/0172261 | A1 | 9/2003 | Lee et al. |
| 2003/0206442 | A1 | 11/2003 | Tang et al. |
| 2004/0068644 | A1 | 4/2004 | Hutton et al. |
| 2004/0230738 | A1 | 11/2004 | Lim et al. |
| 2005/0108500 | A1 | 5/2005 | Kishida et al. |
| 2005/0185472 | A1 | 8/2005 | Randell et al. |
| 2005/0204091 | A1 | 9/2005 | Kilbuck et al. |
| 2006/0010282 | A1 | 1/2006 | Kim |

FOREIGN PATENT DOCUMENTS

| | | |
|---|---|---|
| JP | 2004005946 | 1/2004 |
| JP | 2004319048 | 11/2004 |
| JP | 2005208747 | 8/2005 |
| WO | 0152062 | 7/2001 |

* cited by examiner

RETRIEVING BOOT INSTRUCTIONS FROM NONVOLATILE MEMORY

CLAIM OF PRIORITY

This application is a continuation of U.S. patent application Ser. No. 14/022,576, filed Sep. 10, 2013, which is a continuation of U.S. patent application Ser. No. 12/961,449, filed Dec. 6, 2010, entitled "Retrieving Boot Instructions From Nonvolatile Memory," now U.S. Pat. No. 8,533,448, issued Sep. 10, 2013 which claims priority to U.S. application Ser. No. 11/400,854, filed on Apr. 10, 2006 now U.S. Pat. No. 7,849,302 issued Dec. 7, 2010. The disclosures of these related applications are incorporated herein by reference.

TECHNICAL FIELD

Embodiments described herein are related to the field of booting a processing device, and more particularly to booting directly from a NAND flash memory.

BACKGROUND

Typically, when a processing device is turned on, a boot sequence is initiated to load an operating system and/or a software application into the main memory (e.g., random access memory (RAM)) for the device. The processing device hardware generally uses a small piece of software code that serves to load the operating system. Once loaded, the operating system can be used to control operations performed by the device.

The boot sequence involves using a boot loader to locate code that is used to actually load the operating system. In a typical computer, the boot loader or the basic input-output system (BIOS) is stored in a read only memory (ROM) or in a NOR flash memory at a specific address and serves as a pointer to other locations where the boot code or other application code is located. Similarly, in a typical handheld device, such as an MP3 player or personal digital assistant (PDA), the boot loader is stored in ROM or in a NOR flash memory.

SUMMARY

The use of ROM or a NOR flash to store boot loader code is relatively expensive. Techniques and systems can be implemented to enable execution in place of instructions stored in a NAND flash memory or other nonvolatile storage device for which addressing individual bytes of stored data or individual instructions is not supported by conventional systems.

In one general aspect, a reset signal associated with a device is detected. In response, a predetermined page of data is retrieved from a nonvolatile memory location into a register associated with the nonvolatile memory, wherein each page of data is retrieved from the nonvolatile memory as a unit and the page of data includes instructions for use in booting the device. A command to read data stored in the register is received. The command includes an address identifying a location of one or more instructions within the register. The one or more instructions are then retrieved from the register for execution by a processor.

Implementations can include one or more of the following features. The one or more instructions are retrieved from the register for direct execution on the processor without storing the instructions in another memory. Retrieving the one or more instructions is performed as part of an execution in place. The nonvolatile memory is a NAND flash memory. Retrieving a predetermined page of data is performed automatically in response to detecting the reset signal. Multiple commands to read data stored in the register are received, and the data read in response to the commands includes code for loading separate boot loader code to a random access memory associated with the processor. The separate boot loader code is adapted for loading operating system or application code from the nonvolatile memory to the random access memory. The nonvolatile memory is adapted to enable random access to any byte in the register in response to a command to read data stored in the register. An instruction fetch command from the processor is converted into at least one command to read data stored in the register.

The reset signal is received by a processor in a host device and the host device instructs the nonvolatile memory to load the predetermined page of data. Alternatively, the reset signal is received by the nonvolatile memory, which loads the predetermined page of data in response to the reset signal. Performing execution in place includes receiving one or more commands from a processor, with each command providing an instruction to read a corresponding one or more bytes of data in the register, and sending the corresponding one or more bytes of data to the processor in response to each command. Code is iteratively read and executed from different addresses within the register. The instructions in the register include loader code for reading additional boot loader code from the nonvolatile memory into a separate random access memory for execution by a processor. The boot loader code is adapted to retrieve application or operating system code from the nonvolatile memory using a file system. The loader code and the boot loader code access data stored in the nonvolatile memory using low-level access techniques.

In another general aspect, a nonvolatile memory includes a first quantity of memory locations grouped into pages, and each page of data includes a second quantity of memory locations. The second quantity is fewer in number than the first quantity, and data in the memory locations is accessible by retrieving each page as a whole. A register is used for temporarily storing pages of data retrieved from the memory locations, and a controller is adapted to retrieve a predetermined page of data into the register in response to a predetermined condition and to further respond to certain received commands by retrieving data at an address within the register.

Implementations can include one or more of the following features. The predetermined condition includes receiving a reset signal. The certain received commands are received from a processor and include an indication of the address within the register. The retrieved data is sent to a processor for execution in place in response to the received commands.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
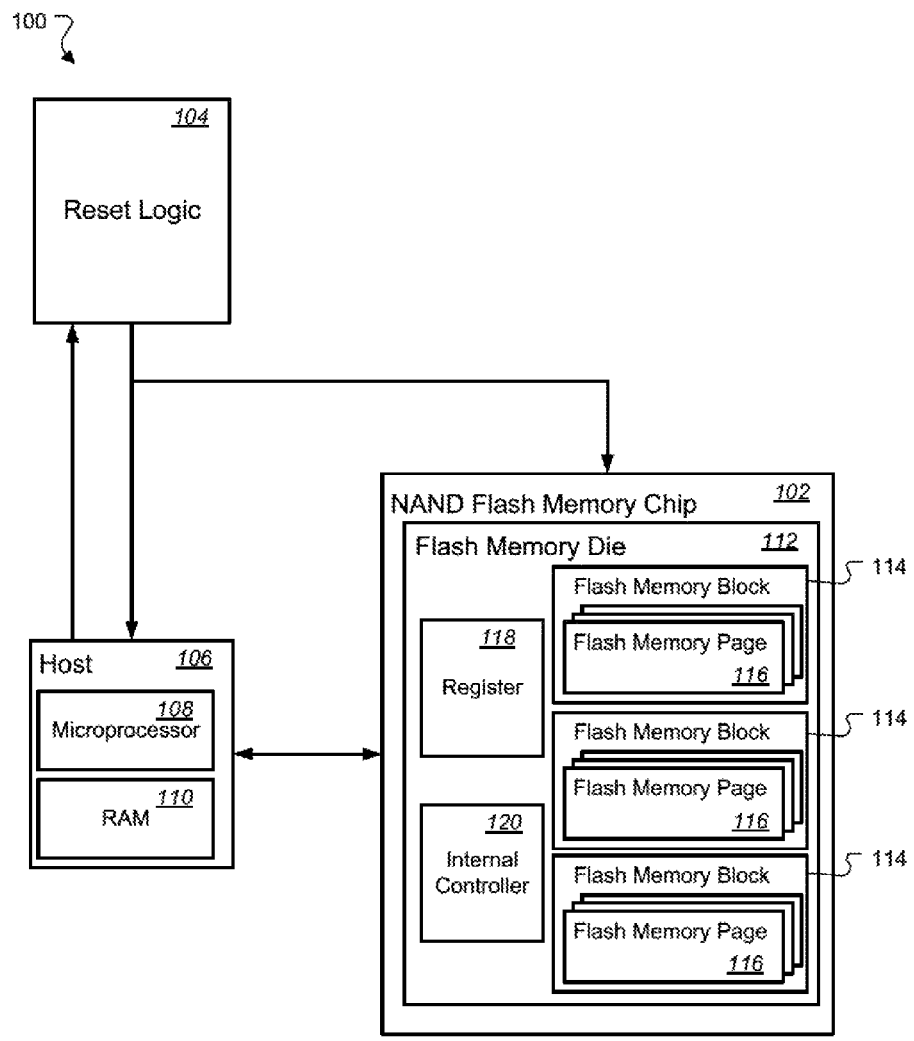
FIG. 1 is a block diagram showing a system that can be initialized using a loader code stored in a NAND flash memory.

FIG. 1 shows a computer system 100 that is capable of performing at least part of a booting process directly from a NAND flash memory chip 102. The computer system 100 can be a portable device, such as a portable music device (e.g. a portable MPEG-1 Audio Layer 3 (MP3) player), such as an iPod™ available from Apple Computer of Cupertino, California, a personal digital assistant, a cell phone, a handheld computer, a removable memory device (e.g., an Universal Serial Bus (USB) flash drive), or other embedded systems, for example. The booting process can be a set of operations that initialize various software components, such as an operating system and application programs, and hardware, such as memory and other peripheral devices, when the computer system 100 is reset. For example, if the computer system 100 is an MP3 player, the booting process may include loading and executing an operating system, running an MP3 playback application, and initializing device drivers from the NAND flash memory.

As shown in FIG. 1, the computer system 100 also includes reset logic 104 and a host device 106. The host device 106 includes a microprocessor 108 and a random access memory (RAM) 110, such as a dynamic RAM or static RAM. The microprocessor 108 is capable of retrieving and executing software instructions stored in the NAND flash memory chip 102. As shown in FIG. 1, the microprocessor 108 can transmit instructions to and retrieve data from the NAND flash memory chip 102. For example, the host device 106 can transmit a write command and a memory address destination for writing data to the NAND flash memory chip 102. In addition, the host device 106 can transmit a read command and a page address to the NAND flash memory chip 102 to retrieve a particular memory page in the NAND flash memory chip 102. Although this description focuses on the use of a NAND flash memory, the described techniques can also be applied to other types of memory designed for the retrieval of data in a block-by-block or page-by-page manner (e.g., memories in which data cannot be retrieved from individual byte addresses within each block or page).

The NAND flash memory chip 102 includes one or more flash memory dies, in which data is stored in flash memory blocks and flash memory pages. As shown, the NAND flash memory chip 102 includes a flash memory die 112. Although only one flash memory die is shown, the NAND flash memory chip 102 may include any practical number of flash memory dies, such as two, three, four, eight, or sixteen, for example. Although only three flash memory blocks 114 are shown, the flash memory die 112 will typically include a large number of flash memory blocks 114. Each of the flash memory blocks 114 includes multiple (e.g., 64 or 128) flash memory pages 116.

The NAND flash memory chip 102 typically stores program instructions and/or other data (e.g., user data, such as MP3 files) in a file system, (e.g., in a Hierarchical File System (HFS), a File Allocation Table (FAT) file system, a New Technology File System NTFS, a second extended file system ext2, an ISO 9660 file system, an Universal Disk Format (UDF), etc.). When data is stored in a file system, the data can only be accessed in predefined segments or blocks with a predefined block size. For example, in the computer system 100, data can be retrieved in a block with the size of the flash memory page 116. In some implementations, the operating system and the application programs are stored in a file system in the NAND flash memory chip 102.

The NAND flash memory chip 102 can also be used to store and retrieve data using low-level access techniques (i.e., without using a file system). Data that is stored without a file system, for example, can be stored in one or more predetermined blocks or pages and without using specialized allocation techniques, metadata, and the like.

The NAND flash memory chip 102 also includes a register 118 and an internal controller 120. The internal controller 120 operates to receive commands, such as read commands or write commands, from external processors (e.g., microprocessor 108) to enable access to data in the flash memory blocks 114. The register 118 provides temporary storage of a segment of data, such as a page of data, so that the data can be loaded, for example, into the RAM 110 by the microprocessor 108 of the host device 106. When the microprocessor 108 sends a request to read data stored on the NAND flash memory chip 102, the appropriate flash memory pages that contain the requested data are successively loaded from the flash memory blocks 114 into the register 118. Each page can then be loaded, as a whole, from the register 118 to the RAM 110 of the host device 106.

Typically, boot code for performing a booting process is stored in a ROM or NOR flash memory associated with the host device 106 and/or the microprocessor 108. Such memories generally support addressing schemes that provide access to individual bytes of data within the ROM or the NOR flash memory where the boot code is located. In some cases, boot loader code in the ROM or the NOR flash memory can be used to load additional boot code from another location into the RAM 110 for the microprocessor 108. Once the device 106 is booted, data, including software code and user data (e.g., MP3 files), stored in other nonvolatile memories (e.g., in a NAND flash memory) can be accessed by the microprocessor 108.

In the computer system 100, however, boot code for performing the booting process may be stored in the NAND flash memory chip 102. When the computer system 100 is reset or is powered on, the host device 106 can directly execute (i.e., execute in place (XIP)) at least a portion of the boot code (e.g., the boot loader) from the NAND flash memory chip 102 without first moving the portion of the boot code into another memory (e.g., RAM 110 in the host device 106).

Conventionally, execution in place cannot be performed using a NAND flash memory because data can only be retrieved in blocks or pages. In the computer system 100, however, the host microprocessor 108 can request and retrieve individual bytes or words of data from the NAND flash memory chip 102 by addressing locations within the register 118. For example, the NAND flash memory chip 102 can support the ability to retrieve a particular byte or a word of data from the NAND flash memory chip 102 by loading a block 114 or page 116 of data into the register 118 and allowing the microprocessor 108 to request specific addresses within the register 118. These capabilities can be used to allow the microprocessor 108 to perform execution in place of code stored in the NAND flash memory chip 102. For purposes of this description, execution in place can include the execution of code that is loaded into the register 118 of the flash memory die 112 provided that the code is not moved onto a RAM or other memory external to the flash memory die 112 or the NAND flash memory chip 102. In some implementations, at least some of the boot code (e.g., initial loader code) is stored without a file system. The microprocessor 108 can access such code using low-level access techniques, such as using assembly language or machine operation code (op-code).

The microprocessor 108 can either indirectly or directly execute codes stored in the NAND flash memory chip 102. For example, the microprocessor 108 can indirectly execute a code stored in the NAND flash memory chip 102 by first loading a page of data, including the code, into the RAM 120. Then the microprocessor 108 can read the code from the RAM 110 and execute the code in a conventional manner.

To facilitate execution in place techniques in the computer system 100, however, the internal controller 120 of the NAND flash memory chip 102 may be designed to support an addressing system that allows a portion, such as a byte, of data in the register 118 to be accessed individually by the microprocessor 108 for direct execution (i.e., without reading the code to the RAM 110). For example, the host device 106 can be modified to transmit a "simple read" command that includes a column address within a memory page for use in randomly accessing data within a predetermined memory page in the NAND flash memory chip 102 once the page is retrieved into the register 118 within the flash memory chip 102. In some implementations, the internal controller 120 can also be programmed to automatically load a specific page of data into the register 118 when a reset signal, a reset command, or other specific signal is received. Thus, the internal controller 120 can pre-load a page of code into the register 118.

Then, by using the simple read command to access the code, the microprocessor 108 can request the code by a column address of the register 118. When the system 100 is reset, the microprocessor 108 can use the simple read command to fetch and directly execute least one booting instruction. In some implementations, instead of automatically loading a specific page of data into the register 118, the internal controller 120 may transfer one or more bytes of data into the register 118 in response to a first command from the microprocessor 108. Then the internal controller 120 may receive subsequent commands (e.g., simple read commands) from the microprocessor 108 to send one or more particular bytes of data from the register 118 to the microprocessor 108.

Typically, a boot sequence is initiated by the reset logic 104. The reset logic 104 can transmit a reset signal to the host 106 and the NAND flash memory chip 102. The reset logic 104 may be implemented mechanically or electrically. In some implementations, the reset logic 104 can be a mechanical switch, such as a push button, that sends the reset signal to the host device 106 and the NAND flash memory chip 102 when the mechanical switch is triggered. For example, the mechanical switch can be a push button that connects to a pull down resister. When the push button is pressed, a logical low signal may be generated and transmitted to the host device 106 and the NAND flash memory chip 102. In other implementations, the reset logic 104 can optically or electrically receive a reset command from the host device 106. Then the reset logic 104 can transmit a reset signal to the host 106 and the NAND flash memory chip 102.

When the computer system 100 is restarted, such as when the system 100 is turned on or reset, the computer system 100 does not have an operating system and an application software in the RAM 110. To load the operating system and/or other software, which may be stored in a file system, from the NAND flash memory chip 102 to the RAM 110, the microprocessor 108 may execute a boot process to find and load the operating system. In some implementations, multiple-stage boot process can be used, in which several small programs summon each other, until the last of them loads the operating system. For example, the computer system 100 may be implemented with a 3-tier boot process, in which three stages of boot process are implemented. The code in the first stage (e.g., an initial loader code, or NAND loader code) can initialize a small portion of hardware, such as the RAM 110, and find and load a boot loader code from the NAND flash memory blocks 114. The boot loader code may be executed in the second stage to initialize other hardware in the computer system 100, such as initializing device drivers, and find and load the operating system and application software from the NAND flash memory blocks 114 to the RAM 110. Some examples of second stage boot loaders are Linux Loader (LILO) and Grand Unified Bootloader (GRUB). In the third stage, the operating system and the application software are executed to provide normal function of the computer system 100.

In some implementations, the internal controller 120 may be programmed to automatically load a NAND loader code in the first stage of the booting process from a predetermined flash memory page (e.g., page "0") into the register 118. Then, the microprocessor 108 can use the simple read command to fetch and directly execute individual instructions or subsets of instructions from the NAND loader code from the register 118 to boot the computer system 100. For example, the microprocessor 108 may be implemented with logic that allows instructions to be fetched from either the RAM 110 or the register 118. Upon reset, the microprocessor 108 automatically executes (i.e., using execution in place) a sequence of instructions from the NAND loader code located at predetermined addresses within the register 118 to search for and load a boot loader code into the RAM 110. The microprocessor 108 then executes the boot loader code stored in the RAM 110 to load the operating system and the application software. The NAND loader code is described in more detail below in connection with FIG. 4.

Figure 2:
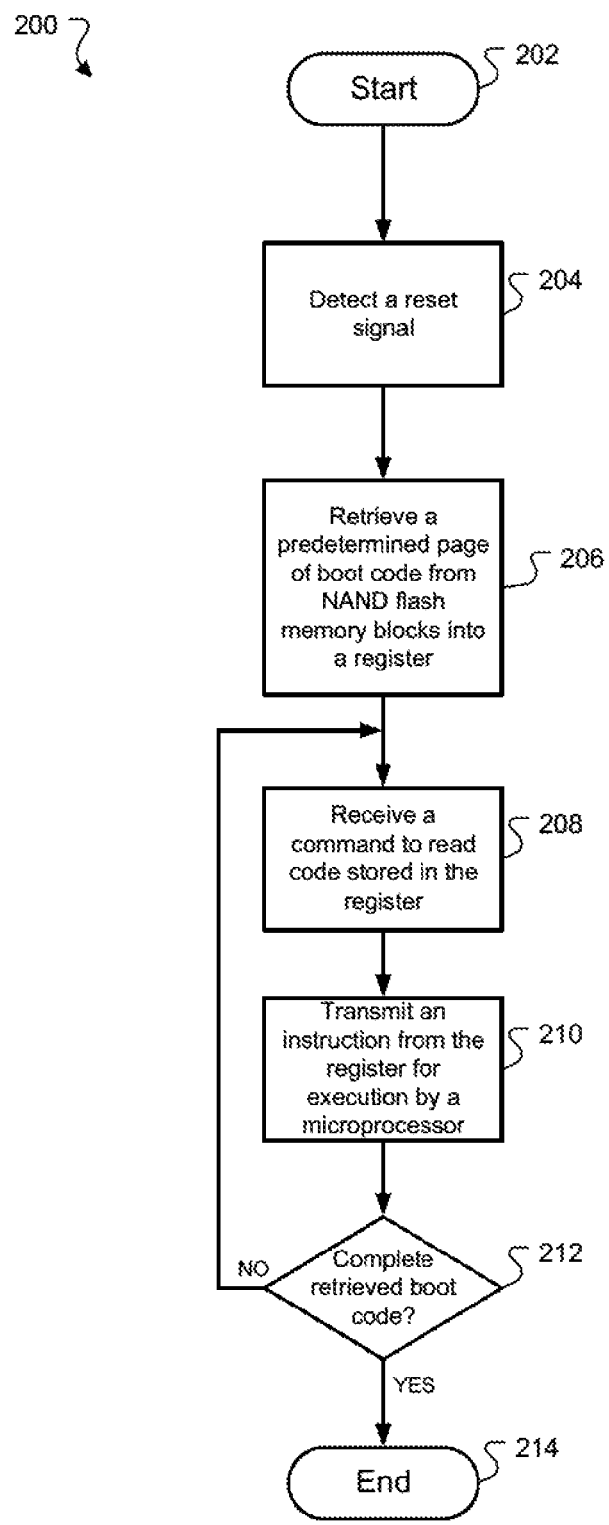
FIG. 2 is a flow diagram illustrating a method for booting a computer system.

FIG. 2 shows a flow diagram of a process 200 for booting a computer system, such as the computer system 100 of FIG. 1. The booting process 200 can be performed by an internal memory controller that automatically loads a segment or a page of code from a predetermined memory address to a register, and transmits one or more instructions from the register to a processor for execution, upon receiving a command from the processor. For example, the internal memory controller may be the internal controller 120.

The computer system 100 is reset (at 202). For example, a user of the computer system 100 may press the power button to turn on the computer system 100. As a result, the reset logic 104 may transmit a reset signal to the NAND flash memory chip 102 and the host device 106. Alternatively, the host device 106 may receive the reset signal, and the microprocessor 108 may forward the reset command to the NAND flash memory chip 102. The internal controller 120 detects the reset signal (at 204).

After detecting the reset signal, the internal controller 120 retrieves a predetermined page of data from the NAND flash memory blocks 114 into the register 118 (at 206). The page may be selected as a page that includes code used in the booting sequence. In some implementations, the retrieved boot code may be one stage of the booting process that may summon boot codes in a later stage to complete the booting process. For example, the retrieved code may be NAND loader code that is used to locate and load a boot loader for performing primary booting operations. The NAND loader code may be retrieved using low-level access techniques, while the boot loader may be retrieved using file system access techniques. In other implementations, executing the retrieved boot code may be sufficient to complete the booting process. In other words, the code that is retrieved into the register 118 may be capable of fully booting the host device 106.

The internal controller 120 receives a command to read the retrieved code in the register 118 (at 208). For example, the internal controller 120 may receive a command from the microprocessor 108 to read data from a specific column address in the register 118. Generally, the data at the specific column address includes one or more instructions for use in the boot sequence. The command may be a simple read command issued by the microprocessor 108. In response, the internal controller 120 can transmit the one or more instructions from the register 118 for execution by the microprocessor 108 without storing the data in another memory. In other words, the microprocessor 108 performs execution in place on the one or more instructions.

Next, a determination is made as to whether the execution of the NAND loader code is completed (at 212). For example, the internal controller 120 may determine that the NAND loader code is completed when a conventional page access command (e.g., read, write, or erase) is received from the microprocessor 108. Such a command might instruct the internal controller 120 to load the boot loader from another page of the flash memory. Alternatively, the microprocessor 108 may determine that execution in place of the NAND loader code is complete when it has the information necessary to retrieve the boot loader. In some implementations, however, the boot loader may also be executed using execution in place techniques. In some implementations, it is unnecessary to have an explicit determination that the execution of the NAND loader code is completed; instead, the execution of the NAND loader code, in accordance with its own programmed operations, may simply result in a transition into the use of conventional page access commands. Once execution of the NAND loader code is completed, then the process 200 ends (at 214). Otherwise, if additional NAND loader code exists, then the process 200 continues reading additional code from the register 118 at another predetermined address. For example, once the microprocessor 108 executes the initial instructions or subset of instructions, the microprocessor 108 may send another simple read command to jump to another address within the register 118 where the next instruction or subset of instructions are located.

Figure 3:
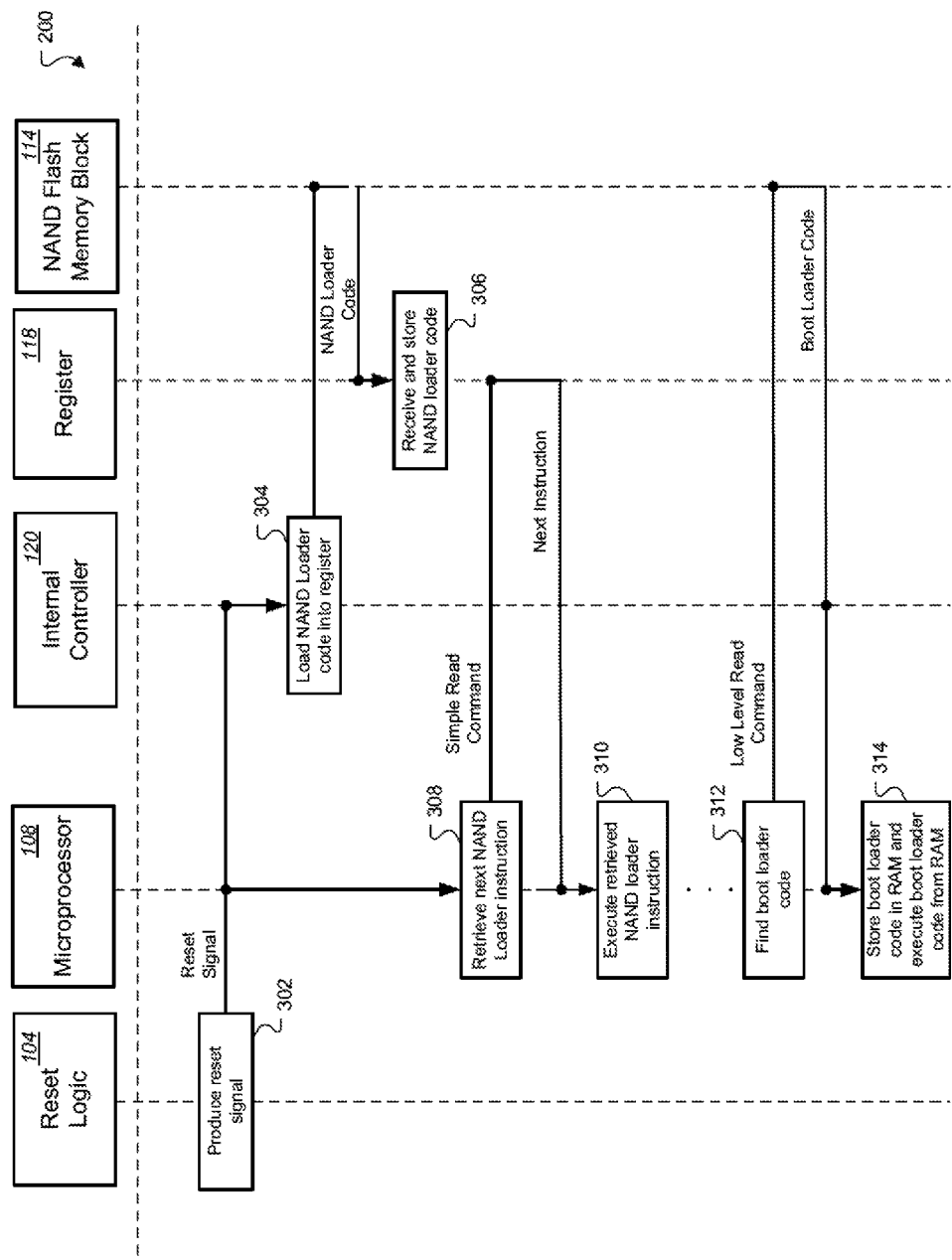
FIG. 3 is a flow diagram illustrating operations performed by a reset logic, a microprocessor, a NAND internal controller, a register, and a NAND flash memory during system reset.

FIG. 3 shows a flow diagram illustrating operations 300 performed by various components to reset the computer system 100. The operations 300 may be performed under the control, supervision, and/or monitoring of the computer system 100. The operations 300 may also be supplemented or augmented by other processing and/or control elements that may be incorporated in the computer system 100. Some or all of the operations, although shown to be performed by a single element, may be performed by one or more processors executing instructions tangibly embodied in a signal. The processing may be implemented using analog and/or digital hardware or techniques, either alone or in cooperation with one or more processors executing instructions. For clarity, the operations 300 are indicated as occurring at the reset logic 104, the microprocessor 108, the internal controller 120, the register 118, and the NAND flash memory blocks 114. However, the operations or similar operations could be carried out by other devices or sites or with a different arrangement of devices or sites.

In this example, the computer system 100 includes a 3-tier boot process in which the microprocessor 108 first executes the NAND loader code directly from the NAND flash memory chip 102 (i.e., using execution in place techniques), then executes the boot loader code by loading the boot loader code into the RAM 110, and finally loads and runs the operating system and application programs for normal use of the host device 106 and/or the computer system 100. In this example, the operation 300 begins when the reset logic 104 receives a reset command. The reset logic 104 produces a reset signal (at 302) and transmits the reset signal to the microprocessor 108 and the internal controller 120 in response to the reset command.

The internal controller 120 loads the NAND loader code into the register 118 by retrieving data from the NAND flash memory blocks 114 (at 304). For example, the internal controller 120 may be programmed with a predetermined page address such that, upon receiving the reset signal, the internal controller 120 transmits a command to load the NAND loader code from the predetermined page address to the register 118. For example, the predetermined page address may be preset during manufacturing stage using mechanical switches or hard wiring of electrical circuits in the NAND flash memory chip 102. In alternative implementations, the internal controller 120 may receive a command from the microprocessor 108 to load the predetermined page of data into the register 118 for booting. When the internal controller 120 retrieves data from the NAND flash memory blocks 114, the register 118 receives and stores the NAND loader code (at 306).

After the microcontroller 108 receives the reset signal (at 308) the microcontroller 108 issues a simple read command to retrieve a next instruction of the NAND loader code from the register 118. As an example, the microprocessor 108 can start retrieving instructions from the register 118 when the internal controller 120 transmits a ready signal to the microprocessor 108. As another example, the microprocessor 108 can start retrieving instructions from the register 118 after a predefined number of wait states.

The simple read command differs from conventional read commands in that it allows the microprocessor 108 to retrieve selected portions of the data stored in the register 118 for direct execution. In some implementations, the simple read command may be generated in the microprocessor 108 by converting conventional instruction fetch commands generated after receiving a reset signal. In other implementations, the microprocessor 108 may simply be preprogrammed to generate a series of simple read commands after receiving a reset signal. Each simple read command can be used to retrieve one or more instructions (e.g., by including more than one column address).

Using the simple read command, the microprocessor 108 can randomly access the register 118 to retrieve the next instruction. For example, the microcontroller 108 can retrieve an instruction from the register 118 by specifying a column address in the register 118. Subsequently, when the microprocessor 108 receives the next instruction, the microprocessor 108 can directly execute the retrieved instruction (at 310) without loading the instruction into the local RAM. In some implementations, the microprocessor 108 is preprogrammed with an address to retrieve the first instruction after reset. For example, the microprocessor 108 may be preprogrammed such that the first instruction retrieved after reset is in the address "0" of the register 118.

The microprocessor 108 may use various methods to determine the address of the next instructions. In some implementations, the retrieved instruction may contain information about the address of the next instruction. In other implementations, the microprocessor 108 may compute an address of a next instruction by incrementing the address of a current instruction by a fixed integer, such as four. In some implementations, the microprocessor 108 is preprogrammed with a sequence of addresses from which instructions are to be retrieved from the register 118. In some implementations, the microprocessor 108 can repeat steps 308 and 310 a number of times before the microprocessor 108 executes other portion of the boot code. The execution of the NAND loader code may initialize the RAM 110 to store the boot loader code along with loading the boot loader code into the RAM 110.

The microprocessor 108 executes instructions (at 312) to find and load the boot loader code from the NAND flash memory blocks 114. Although the operation of finding the boot loader code (at 312) is illustrated as a separate operation from executing retrieved NAND loader instructions (at 310) for convenience of illustration and discussion, it will be understood that, typically, one of the functions and operations of the retrieved NAND loader instructions is to find or retrieve the boot loader code. Thus, the operations illustrated at 312 may overlap with or be a subset of the operations at 310. In some implementations, the microprocessor 108 uses low level access techniques, such as using machine opcodes, to find and retrieve boot loader code from the NAND flash memory blocks 114, rather than using a file system such as FAT or HFS. The microprocessor 108 stores the retrieved boot loader code in the RAM 110 and executes the boot loader code from the RAM 110 (at 314). As in conventional systems, the boot loader code operates to load and initiate the operating system and/or application software to place the host device 106 or computer system 100 in a normal operating mode.

Figure 4:
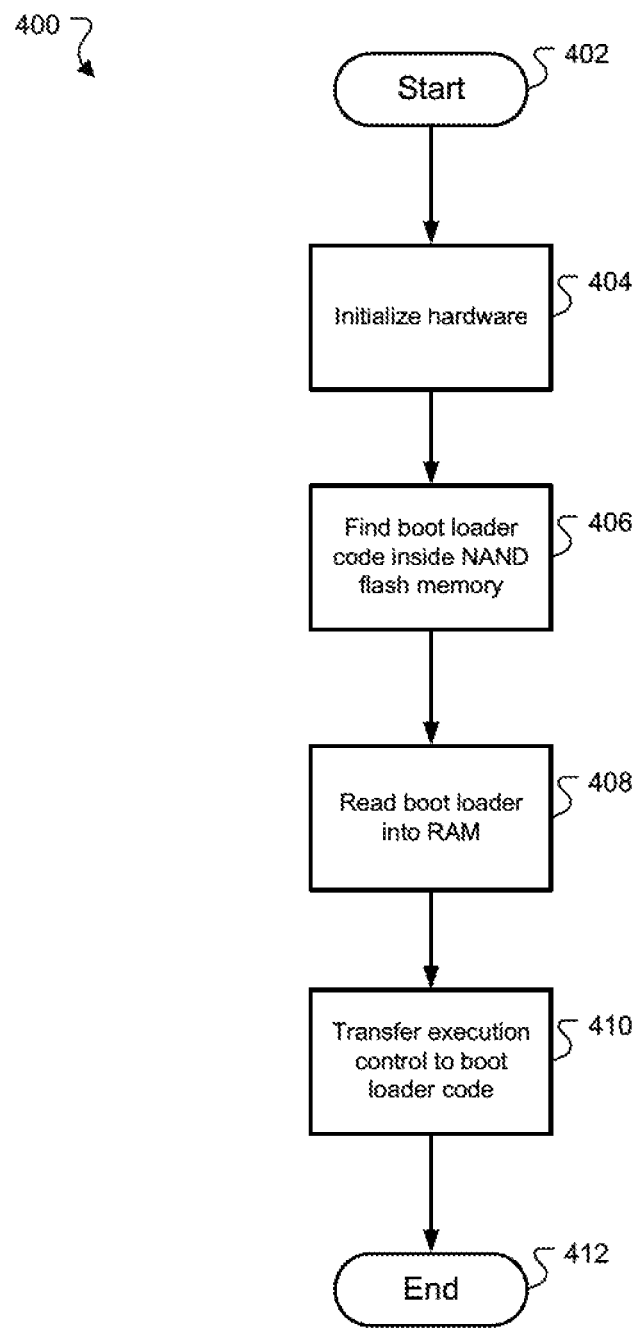
FIG. 4 is a flow diagram illustrating one implementation of a NAND loader code.

FIG. 4 shows a flowchart of a process 400 that may be performed by the NAND loader code. As described above, the NAND loader code is stored in a predetermined page in the NAND flash memory chip 102. In some implementations, when the internal controller 120 detects a reset signal, the internal controller 120 automatically loads the NAND loader code into the register 118. The instructions included in the NAND loader code can be executed directly from the register 118 by the microprocessor 108. Thus, the internal controller 120 loads the NAND loader code into the register (at 402), and the microprocessor 108 starts to directly execute the instructions in the NAND loader code retrieved from the NAND flash memory chip 102.

Using the instructions in the NAND loader code, the microprocessor 108 initializes hardware (at 404), such as the RAM 110 and other hardware for booting (e.g., a program counter and status registers), in the microprocessor 108. Then, the microprocessor 108 finds a boot loader code stored at another location in the NAND flash memory (at 406). In some implementations, some instructions in the NAND loader code may include a page address of the boot loader code. In other implementations, the NAND loader code may include instructions that enable the microprocessor 108 to compute the memory address of the boot loader code. For example, the instruction may include an offset value that the memory address of the boot loader code is the sum of the address of current instruction and the offset value.

Next, the microprocessor 108 reads the boot loader code into the RAM 110 (at 408). The microprocessor 108 may read the boot loader code into the RAM 110 using low-level access techniques. After the boot loader code is stored in the RAM 110, the microprocessor 108 executes an instruction in the NAND loader code to transfer execution control to the boot loader code (at 410). The process 400 ends at 412.

The invention and most of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. Portions of the processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. In some implementations, the described processes and techniques may be limited to use in connection with NAND flash memories or other nonvolatile memories in which individual memory locations are not separately addressable. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A number of implementations have been described. Nevertheless, it will be understood that various modifications may be made. For example, in some cases, operations can be performed in a different order than that described and shown in the Figures. In addition, the techniques can be used in connection with nonvolatile memories other than NAND flash memories, such as other memories in which data typically cannot be randomly accessed and/or retrieved on a byte-by-byte basis. Moreover, loading of a predetermined page of data from the flash memory blocks into the register can be performed in response to one or more predetermined conditions other than the receipt of a reset signal. Accordingly, other implementations are within the scope of the following claims.

What is claimed is:

1. A method for booting a computing device, the method comprising:
    detecting a reset signal by a non-volatile memory die, wherein the non-volatile memory die includes an internal controller, a register, and non-volatile memory, and wherein the non-volatile memory includes a plurality of pages of data;
    retrieving, by the internal controller, a predetermined page of data from the non-volatile memory responsive to detecting the reset signal, wherein each of the plurality of pages of data is retrieved from the non-volatile memory as a unit and the predetermined page of data includes at least one instruction for booting the computing device;
    storing, by the internal controller, the predetermined page of data into the register;
    fetching, by a host processor, the at least one instruction from the register using at least one simple read command, wherein the simple read command includes an address for randomly accessing locations within the predetermined page of data;
    executing the at least one instruction by the host processor; and
    fetching, by the host processor, a second page of data from the non-volatile memory using a read command, wherein the read command retrieves the second page of data, and wherein the second page of data is different from the predetermined page of data.

2. The method of claim 1, wherein the non-volatile memory comprises a NAND flash memory.

3. The method of claim 1, wherein retrieving the predetermined page of data is performed automatically in response to detecting the reset signal.

4. The method of claim 1, further comprising fetching a plurality of instructions from the register, wherein the plurality of instructions, when executed by the host processor, cause the host processor to read boot loader code from the non-volatile memory and store the boot loader code in a random access memory.

5. The method of claim 4, wherein the boot loader code includes instructions for copying operating system code or application code from the non-volatile memory to the random access memory.

6. The method of claim 1, further comprising reading at random, by the host processor, data stored at any address in the register.

7. The method of claim 4, wherein a given instruction of the plurality of instructions includes information regarding an address of a next instruction to be fetched from the plurality of instructions.

8. An apparatus comprising:
    a plurality of non-volatile memory blocks, wherein each memory block includes a plurality of pages of data, wherein each of the plurality of pages of data is retrieved from a respective non-volatile memory block as a unit;
    a register configured to store at least a page of data; and
    circuitry configured to:
        detect a reset signal;
        retrieve a predetermined page of data from a first non-volatile memory block of the plurality of non-volatile memory blocks responsive to detecting the reset signal, wherein the predetermined page of data includes at least one instruction for booting the host processor; and
        store the predetermined page of data including the at least one instruction in the register;
    wherein the register is further configured to provide the at least one instruction to the host processor responsive to receiving at least one simple read command from the host processor, wherein the simple read command includes an address for randomly accessing locations within the predetermined page of data; and
    wherein the circuitry is further configured to:
        retrieve a second page of data from a second non-volatile memory block in response to receiving a read command from the host processor, wherein the read command retrieves the second page of data, and wherein the second page of data is different from the predetermined page of data; and
        sending the second page of data to the host processor.

9. The apparatus of claim 8, wherein the plurality of non-volatile memory blocks comprises a plurality of NAND flash memory blocks.

10. The apparatus of claim 8, wherein the circuitry is further configured to retrieve the predetermined page of data automatically in response to detecting the reset signal.

11. The apparatus of claim 8, wherein the predetermined page of data includes a plurality of instructions for the host processor.

12. The apparatus of claim 11, wherein a given instruction of the plurality of instructions includes information regarding an address of a next instruction to be provided from the plurality of instructions.

13. The apparatus of claim 8, wherein the register is configured to enable random access to data stored at any address in the register in response to a given read command from the host processor.

14. A system comprising:
    a host processor; and
    a non-volatile memory device, separate from the host processor, wherein the non-volatile memory device includes:
        one or more non-volatile memory blocks, wherein each memory block includes a plurality of pages of data, wherein each of the plurality of pages of data is retrieved from a respective non-volatile memory block as a unit; and
        a register;
    wherein the non-volatile memory device is configured to:
        detect a reset signal;
        retrieve a predetermined page of data from a first non-volatile memory block responsive to detecting the reset signal, wherein the predetermined page of data includes at least one instruction for booting the host processor; and
        store the predetermined page of data including the at least one instruction in the register;
    wherein the host processor is configured to:
        fetch the at least one instruction from the register using at least one simple read command, wherein the simple read command includes an address for randomly accessing locations within the predetermined page of data; and execute the at least one instruction;

fetch a second page of data from a second non-volatile memory block using a read command, wherein the read command retrieves the second page of data, and wherein the second page of data is different from the predetermined page of data.

15. The system of claim 14, wherein the non-volatile memory device comprises a NAND flash memory device.

16. The system of claim 14, wherein the non-volatile memory device is further configured to retrieve the predetermined page of data automatically in response to detecting the reset signal.

17. The system of claim 14, further comprising a random access memory, wherein the host processor is further configured to fetch a plurality of instructions from the register, wherein the fetched instructions cause the host processor to read boot loader code from the non-volatile memory device and store the boot loader code in the random access memory.

18. The system of claim 17, wherein the boot loader code includes instructions for copying operating system code or application code from the non-volatile memory device to the random access memory.

19. The system of claim 14, wherein the non-volatile memory device is configured to enable random access to data stored at any address in the register in response to a read command from the host processor.

20. The system of claim 14, wherein the host processor is further configured to convert an instruction fetch command into at least one command to read data from the register.

\* \* \* \* \*